(12) United States Patent
Maruyama et al.

(10) Patent No.: US 11,482,356 B2
(45) Date of Patent: Oct. 25, 2022

(54) POWDER CORE, ELECTRIC OR ELECTRONIC COMPONENT INCLUDING THE POWDER CORE AND ELECTRIC OR ELECTRONIC DEVICE HAVING THE ELECTRIC OR ELECTRONIC COMPONENT MOUNTED THEREIN

(71) Applicant: Alps Alpine Co., Ltd., Tokyo (JP)

(72) Inventors: Satoshi Maruyama, Miyagi-ken (JP); Masao Matsui, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 735 days.

(21) Appl. No.: 16/504,787

(22) Filed: Jul. 8, 2019

(65) Prior Publication Data

US 2019/0333665 A1    Oct. 31, 2019

Related U.S. Application Data

(63) Continuation of application No. PCT/JP2017/035513, filed on Sep. 29, 2017.

(30) Foreign Application Priority Data

Jan. 31, 2017  (JP) .............................. JP2017-015097

(51) Int. Cl.
*H01F 27/24*  (2006.01)
*H01F 1/26*   (2006.01)
(Continued)

(52) U.S. Cl.
CPC ............... *H01F 1/26* (2013.01); *C22C 38/00* (2013.01); *H01F 1/14758* (2013.01);
(Continued)

(58) Field of Classification Search
CPC .... H01F 1/26; H01F 1/14758; H01F 1/15308; H01F 1/15333; H01F 3/08; H01F 27/255;
(Continued)

(56) References Cited

U.S. PATENT DOCUMENTS

| 5,211,896 A | 5/1993 | Ward et al. |
| 2003/0175524 A1 | 9/2003 | Sashi et al. |

(Continued)

FOREIGN PATENT DOCUMENTS

| CN | 101578669 | 11/2009 |
| CN | 101641174 | 2/2010 |

(Continued)

OTHER PUBLICATIONS

Chinese Office Action from Chinese Application No. 201780084087.7 dated Apr. 28, 2020.

(Continued)

*Primary Examiner* — Tuyen T Nguyen
(74) *Attorney, Agent, or Firm* — Beyer Law Group LLP

(57) ABSTRACT

A powder core includes a compact including a soft magnetic powder, and an outer coating of the compact. The outer coating contains polyethersulfone. An electric or electronic component including the powder core, and an electric or electronic device having the electric or electronic component mounted therein are also provided.

20 Claims, 4 Drawing Sheets

(51) Int. Cl.
  *C22C 38/00* (2006.01)
  *H01F 1/147* (2006.01)
  *H01F 1/153* (2006.01)
  *H01F 3/08* (2006.01)
  *H01F 27/255* (2006.01)
  *H01F 27/29* (2006.01)
  *H01F 41/02* (2006.01)

(52) U.S. Cl.
  CPC ..... *H01F 1/15308* (2013.01); *H01F 1/15333* (2013.01); *H01F 3/08* (2013.01); *H01F 27/255* (2013.01); *H01F 27/29* (2013.01); *H01F 41/0246* (2013.01)

(58) Field of Classification Search
  CPC .... H01F 27/29; H01F 41/0246; H01F 17/062; C22C 38/00; C22C 2202/02; C22C 33/02; B22F 1/07; B22F 1/102; B22F 1/148; B22F 9/002; B22F 9/026; B22F 2998/10; B22F 2999/00; B22F 5/106; B22F 3/1021; B22F 2003/242; C08J 7/04
  See application file for complete search history.

(56) References Cited

U.S. PATENT DOCUMENTS

| | | | |
|---|---|---|---|
| 2004/0137247 A1 | 7/2004 | Ono et al. | |
| 2010/0015432 A1 | 1/2010 | Bergmark et al. | |
| 2010/0044618 A1 | 2/2010 | Ishimine et al. | |
| 2014/0062638 A1* | 3/2014 | Sasamori | H01F 27/292 29/605 |
| 2014/0320256 A1* | 10/2014 | Inaba | H01F 27/00 336/221 |
| 2017/0278618 A1 | 9/2017 | Matsui et al. | |
| 2019/0131040 A1* | 5/2019 | Ikeda | B22F 3/24 |

FOREIGN PATENT DOCUMENTS

| | | | |
|---|---|---|---|
| JP | 2002-60674 | | 2/2002 |
| JP | 2002-309379 | | 10/2002 |
| JP | 2004-172263 | | 6/2004 |
| JP | 2004349585 | A * | 12/2004 |
| JP | 2006-49407 | | 2/2006 |
| JP | 3145832 | U | 1/2009 |
| JP | 2010-522273 | | 7/2010 |
| JP | 2012-105092 | | 5/2012 |
| JP | 2015-12146 | | 1/2015 |
| JP | 2016-127070 | | 7/2016 |
| KR | 2003-0092069 | | 12/2003 |
| WO | 2016/117201 | | 7/2016 |

OTHER PUBLICATIONS

Supplementary European Search Report for European Application No. 17895195 dated Jul. 27, 2020.
Korean Office Action from Korean Application No. 10-2019-7018252 dated Jul. 19, 2019.
International Search Report from International Application No. PCT/JP2017/035513 dated Dec. 19, 2017.
Japanese Publication No. 2002-60674—A computerized English translation is submitted herewith.
Japanese Publication No. 2010-522273—The English equivalent for the Japanese publication is U.S. Publication No. 2010/0015432.
Japanese Publication No. 2015-12146—A computerized English translation is submitted herewith.
International Publication No. 2016/117201—The English equivalent for the Japanese publication is U.S. Publication No. 2017/0278618.
Japanese Publication No. 2012-105092—A computerized English translation is submitted herewith.
Japanese Publication No. 2002-309379—The English equivalent for the Japanese publication is U.S. Publication No. 2003/0175524.
Japanese Publication No. 2016-127070—A computerized English translation is submitted herewith.
Japanese Publication No. 2006-49407—A computerized English translation is submitted herewith.
Japanese Publication No. 3145832U—A concise description of the Japanese Utility Model publication is provided in paragraph [0004] of the specification.

* cited by examiner

POWDER CORE, ELECTRIC OR ELECTRONIC COMPONENT INCLUDING THE POWDER CORE AND ELECTRIC OR ELECTRONIC DEVICE HAVING THE ELECTRIC OR ELECTRONIC COMPONENT MOUNTED THEREIN

CLAIM OF PRIORITY

This application is a Continuation of International Application No. PCT/JP2017/035513 filed on Sep. 29, 2017, which claims benefit of Japanese Patent Application No. 2017-015097 filed on Jan. 31, 2017. The entire contents of each application noted above are hereby incorporated by reference.

BACKGROUND OF THE INVENTION

1. Field of the Invention

The present invention relates to a powder core, an electric or electronic component including the powder core, and an electric or electronic device having the electric or electronic component mounted therein.

2. Description of the Related Art

Electric and electronic components such as reactors, transformers, and choke coils are used in electric and electronic devices such as power circuits in data center servers, booster circuits of hybrid cars and the like, and equipment in power stations and transformer stations. Some of these electric and electronic components use powder cores as magnetic members. A powder core includes a compact obtained by powder-compacting a large number of soft magnetic particles and heat-treating the obtained compacted product.

Since a powder core is a compact of soft magnetic particles as described above, the powder core is in some cases equipped with an outer coating from the viewpoint of increasing the mechanical strength. Regarding this point, Japanese Registered Utility Model No. 3145832 discloses a composite magnetic material for an inductor, in which soft magnetic metal particles are bonded with a non-magnetic material. The non-magnetic material has a compacting aid added to and mixed with the soft magnetic metal particles and an impregnating resin impregnating a soft magnetic metal particles/compacting aid compact to serve as a binding material after the soft magnetic metal particles/compacting aid compact is heat-treated. Furthermore, the impregnating resin has a thermal curing temperature of 180° C. or higher at an atmospheric pressure.

The environment in which an electric or electronic device including an electric or electronic component that includes the aforementioned powder core is used varies, and powder cores may be used in an environment that involves a temperature close to 100° C. due to various reasons including high ambient temperatures and proximity to heat-generating components. In such a high-temperature environment, materials constituting the powder core may undergo thermal denaturation. Denaturation of the materials changes the magnetic properties, in particular, the core loss, of the powder core, sometimes resulting in an increase in the quantity of heat generated from the powder core, thereby accelerating the thermal denaturation of the powder core. There is a concern that such changes in magnetic properties of the powder core caused by use in a high-temperature environment would affect the operation stability of the electric or electronic component that includes the powder core. Thus, a powder core that undergoes less change in magnetic properties even in such a high temperature environment is in demand. In addition, it is also desirable that the mechanical strength of the powder core be maintained within an appropriate range even when the powder core is used in such a high temperature environment.

SUMMARY OF THE INVENTION

The present invention provides a powder core that undergoes less changes in magnetic properties even when used in a high temperature environment and that has excellent mechanical properties, an electric or electronic component including the powder core, and an electric or electronic device having the electric or electronic component mounted therein.

An aspect of the present invention provided to solve the problems described above provides a powder core that includes a compact including a soft magnetic powder; and an outer coating of the compact, in which the outer coating contains polyethersulfone.

Compared to a powder core equipped with an outer coating containing a silicone-based resin (in particular, methyl phenyl silicone resin) used heretofore, the powder core of the present invention including the outer coating that contains polyethersulfone undergoes less changes in magnetic properties, in particular, core loss, since stress is rarely generated even when the powder core is put in a high temperature environment (specifically, an environment of 250° C.) for a long time (specifically, 100 hours or longer). In addition, practical mechanical strength can be maintained even when the powder core is placed in a high temperature environment for a long time.

In the powder core of the present invention described above, the soft magnetic powder may contain at least one of a powder of an iron-based material and a powder of a nickel-based material.

In the powder core of the present invention described above, the soft magnetic powder may contain a powder of a crystalline magnetic material. In the powder core of the present invention described above, the soft magnetic powder may contain a powder of an amorphous magnetic material. In the powder core of the present invention described above, the soft magnetic powder may contain a powder of a nanocrystal magnetic material. The soft magnetic powder may be a mixture of two or more selected from the crystalline magnetic material, the amorphous magnetic material, and the nanocrystal magnetic material.

In the powder core of the present invention described above, the compact may include the soft magnetic powder and a binding component, and the binding component may be composed of a pyrolysis residue of a binder component that contains a resin-based material. When the compact in the powder core of the present invention includes the pyrolysis residue described above, voids are likely to form inside the compact. In the powder core of the present invention, since the polyethersulfone resin can be located to fill the voids, hardness can be increased. When a common thermosetting resin is used, the resin is cured during formation of the outer coating or in a high temperature environment, and stress is generated; thus, the soft magnetic powder forming the powder core is put under stress, and the magnetic properties are degraded. When a polyethersulfone resin, which is a thermoplastic resin, is used, changes in stress caused by curing in a high temperature environment can be avoided. Moreover, in a common thermoplastic resin, the strength decreases in a high temperature environment; however, this type of decrease in strength can be avoided by using a polyethersulfone resin, which has high heat resistance.

Yet another aspect of the present invention provides an electric or electronic component including the powder core of the present invention described above, a coil, and connecting terminals respectively connected to end portions of the coil, in which the powder core is placed such that, when an electric current is supplied to the coil through the connecting terminals, at least part of the powder core is positioned inside an induction magnetic field generated by the electric current.

Still another aspect of the present invention provides an electric or electronic device including the electric or electronic component of the present invention described above.

The powder core of the present invention undergoes less changes in magnetic properties, in particular, core loss even when the powder core is put in a high temperature environment (specifically, an environment of 250° C.) for a long time (specifically, 100 hours or longer). In addition, practical mechanical strength can be maintained even when the powder core is put in a high temperature environment for a long time. Thus, a powder core of the present invention undergoes less changes in magnetic properties even when the powder core is used in a high temperature environment, and exhibits excellent mechanical properties. The present invention also provides an electric or electronic component equipped with the powder core, and an electric or electronic device having the electric or electronic component mounted therein.

DESCRIPTION OF THE PREFERRED EMBODIMENTS

Figure 1:
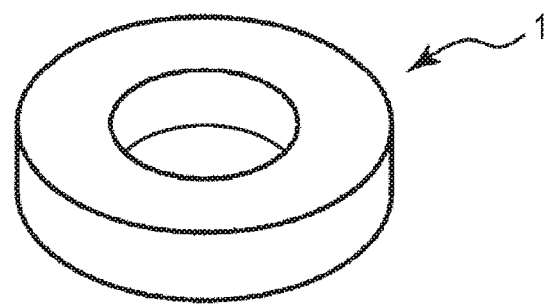
FIG. 1 is a schematic perspective view illustrating the shape of a powder core according to one embodiment of the present invention.

Embodiments of the present invention will now be described in detail.
1. Powder Core A powder core 1 according to one embodiment of the present invention illustrated in FIG. 1 has a ring-shaped appearance, and includes a compact that contains a soft magnetic powder and an outer coating of the compact. In the powder core 1 according to one embodiment of the present invention, the outer coating contains polyethersulfone. In a non-limiting example, a binding component that causes the soft magnetic powder to bond with other materials (the same type of materials in some cases and different types of materials in other cases) contained in the powder core 1 is contained. Note that the appearance of the powder core 1 not limited to the ring shape, and examples of the appearance include EE shape, EI shape, EER shape, PQ shape, and I shape, or the coil may be enclosed inside the powder core.
(1) Compact
(1-1) Soft Magnetic Powder The soft magnetic powder contained in the compact of the powder core 1 according to one embodiment of the present invention may contain at least one of a powder of an iron-based material containing iron and a powder of a nickel-based material containing nickel.

The soft magnetic powder contained in the compact of the powder core 1 according to one embodiment of the present invention may contain a powder of a crystalline magnetic material. In this description, the "crystalline magnetic material" refers to a material that has a crystalline structure and is ferromagnetic, in particular, soft magnetic. The soft magnetic powder contained in the compact of the powder core 1 according to one embodiment of the present invention may be composed of a crystalline magnetic material. Specific examples of the crystalline magnetic material include Fe—Si—Cr alloys, Fe—Ni alloys, Ni—Fe alloys, Fe—Co alloys, Fe—V alloys, Fe—Al alloys, Fe—Si alloys, Fe—Si—Al alloys, carbonyl iron, and pure iron.

The soft magnetic powder contained in the compact of the powder core 1 according to one embodiment of the present invention may contain a powder of an amorphous magnetic material. In this description, the "amorphous magnetic material" refers to a material in which the volume of the amorphous portion is more than 50% of the structure, and which is ferromagnetic, in particular, soft magnetic. The soft magnetic powder contained in the compact of the powder core 1 according to one embodiment of the present invention may be composed of an amorphous magnetic material. Examples of the amorphous magnetic material include Fe—Si—B alloys, Fe—P—C alloys, and Co—Fe—Si—B alloys. The amorphous magnetic material may be composed of one material or multiple materials. The magnetic material constituting the powder of the amorphous magnetic material is preferably at least one material selected from the group consisting of the aforementioned materials; in particular, the magnetic material preferably contains an Fe—P—C alloy and is more preferably composed of an Fe—P—C alloy. However, Fe—P—C alloys have high magnetostriction, and the magnetic properties thereof significantly deteriorate when stress is applied. In such a case, it is effective to use a polyethersulfone resin of the present invention as the outer coating described below since stress from the outer coating is less particularly in a high temperature environment.

Specific examples of the Fe—P—C alloys used as the amorphous magnetic material include Fe-based amorphous alloys represented by the compositional formula, $Fe_{100at\%-a-b-c-x-y-z-t}Ni_aSn_bCr_cP_xC_yB_zSi_t$, where 0 at $\%\leq a\leq 10$ at %, 0 at $\%\leq b\leq 3$ at %, 0 at $\%\leq c\leq 6$ at %, 6.8 at $\%\leq x\leq 13.0$ at %, 2.2 at $\%\leq y\leq 13.0$ at %, 0 at $\%\leq z\leq 9.0$ at %, 0 at $\%\leq t\leq 7$ at %. In the compositional formula described above, Ni, Sn, Cr, B, and Si are optional additive elements.

The Ni content a is preferably 0 at % or more and 7 at % or less and more preferably 4 at % or more and 6.5 at % or less. The Sn content b is preferably 0 at % or more and 2 at % or less and more preferably 0 at % or more and 1 at % or less. The Cr content c is preferably 0 at % or more and 2.5 at % or less and more preferably 1.5 at % or more and 2.5 at % or less. In some cases, the P content x is preferably 8.8 at % or more. In some cases, the C content y is preferably 2.2 at % or more and 9.8 at % or less. The B content z is preferably 0 at % or more and 8.0 at % or less and more preferably 0 at % or more and 2 at % or less. The Si content t is preferably 0 at % or more and 6 at % or less and more preferably 0 at % or more and 2 at % or less.

The soft magnetic powder contained in the compact of the powder core 1 according to one embodiment of the present invention may contain a powder of a nanocrystal magnetic material. In this description, the "nanocrystal magnetic material" refers to a material that has a nanocrystal structure in which crystal grains having an average crystal grain diameter of several nanometers to several tens of nanometers are evenly precipitated in a region that accounts for at least 50% of the structure, and is ferromagnetic, in particular, soft magnetic. In the nanocrystal magnetic material, the structure other than the nanocrystal grains may be amorphous or the entire structure may be a nanocrystal structure. The soft magnetic powder contained in the compact of the powder core 1 according to one embodiment of the present invention may be composed of a powder of a nanocrystal magnetic material. Specific examples of the nanocrystal magnetic material include Fe—Cu-M (where M represents at least one metal element selected from Nb, Zr, Ti, V, Mo, Hf, Ta, and W)—Si—B alloys, Fe-M-B alloys, and Fe—Cu-M-B alloys.

The soft magnetic powder contained in the compact of the powder core 1 according to one embodiment of the present invention may be composed of one powder or may be a mixture of multiple powders. A specific example of the mixture is a mixture of two or more materials selected from a crystalline magnetic material, an amorphous magnetic material, and a nanocrystal magnetic material. More specifically, for example, the soft magnetic powder contained in the compact of the powder core 1 according to one embodiment of the present invention may be a mixture of a powder of a crystalline magnetic material and a powder of an amorphous magnetic material, or may be a powder of an amorphous magnetic material, part of which is a powder of a nanocrystal magnetic material.

The shape of the soft magnetic powder contained in the powder core 1 according to one embodiment of the present invention may be any. The soft magnetic powder may be spherical or non-spherical. When the soft magnetic powder is non-spherical, the shape may have a shape anisotropy, such as a flake shape, an oval shape, a droplet shape, or a needle shape, or the shape may have no particular shape anisotropy and may be irregular. Examples of the soft magnetic powder having an irregular shape include powders in which spherical particles of the soft magnetic powder are in contact with and bonded to one another, or are partly buried in and bonded to other particles of the soft magnetic powder. Such a soft magnetic powder having an irregular shape is often observed when the soft magnetic powder is a powder of carbonyl iron.

The shape of the soft magnetic powder may be a shape obtained at the stage of manufacturing the soft magnetic powder, or may be a shape resulting from secondary processing of the manufactured soft magnetic powder. Examples of the former shape include a spherical shape, an oval shape, a droplet shape, and a needle shape, and an example of the latter shape is a flake shape.

The particle diameter of the soft magnetic powder contained in the powder core 1 according to one embodiment of the present invention may be any. Typically, the particle diameter in terms of a median diameter D50 (the particle diameter at a volume cumulative value of 50% in a volume distribution of the particle diameters of the soft magnetic powder measured by a laser diffraction-scattering method) is in the range of 1 µm to 45 µm. From the viewpoint of enhancing the ease of handling, the viewpoint of increasing the packing density of the soft magnetic powder in the compact of the powder core 1, etc., the median diameter D50 of the soft magnetic powder is preferably 2 µm or more and 30 µm or less, more preferably 3 µm or more and 15 µm or less, and yet more preferably 4 µm or more and 13 µm or less.

1. Binding Component

The composition of the binding component is not particularly limited as long as the binding component is a material that contributes to fixing the soft magnetic powder contained in the powder core 1 according to one embodiment of the present invention. Examples of the material constituting the binding component include organic materials such as resin materials and pyrolysis residues of the resin materials (in this description, these are collectively referred to as "resin material-based components"), and inorganic materials. The pyrolysis residues are formed, for example, after the heat treatment described below for eliminating strain in the soft magnetic powder in the powder core. Examples of the resin material include acrylic resins, silicone resins, epoxy resins, phenolic resins, urea resins, and melamine resins. Examples of the binding component composed of an inorganic material include glass-based materials such as liquid glass. The binding component may be composed of one material or multiple materials. The binding component may be a mixture of an organic material and an inorganic material.

Usually, an insulating material is used as the binding component. In this manner, the insulating properties of the powder core 1 can be enhanced.

A specific example of the compact of the powder core 1 according to one embodiment of the present invention is a compact manufactured by a method that includes a compacting process that involves pressing a mixture of a soft magnetic powder and a binder component. In this description, the "binder component" is a component that gives the binding component, and the binder component is composed of the binding component in some cases or is a material different from the binding component in other cases.

A specific example of the case in which the binder component is different from the binding component is the case in which the binding component in the compact of the powder core 1 according to one embodiment of the present invention is composed of a pyrolysis residue of a binder component containing a resin-based material. During formation of the pyrolysis residue, the binder component is partly decomposed and evaporated. Thus, when the compact in the powder core 1 contains the pyrolysis residue, voids may be generated inside the compact, in particular, between particles of the soft magnetic powder located closest to one another in the compact.

Figure 2A:
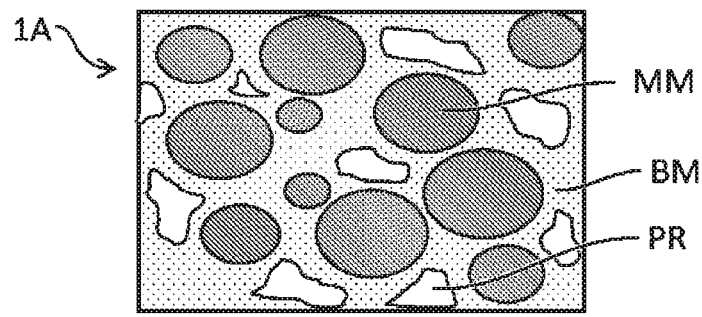
FIG. 2A is a schematic diagram of the inside of a compacted product after a compacting step and before a heat treatment step for manufacturing the powder core according to one embodiment of the present invention.
Figure 2B:
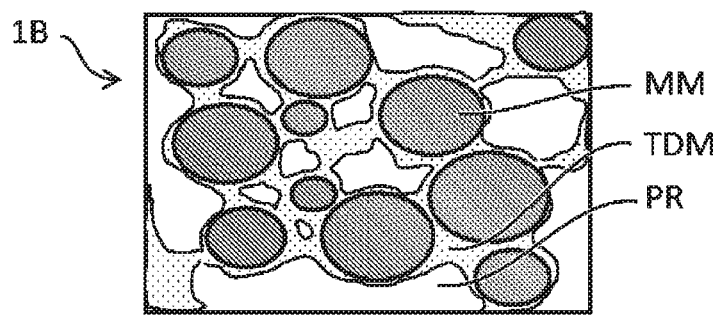
FIG. 2B is a schematic diagram of the inside of the compact after the heat treatment step and before an outer coating step for manufacturing the powder core according to one embodiment of the present invention.
Figure 2C:
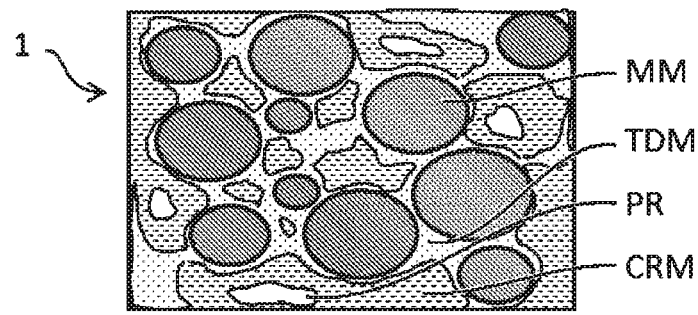
FIG. 2C is a schematic diagram of the inside of the powder core after the outer coating step for manufacturing the powder core according to one embodiment of the present invention.

This point is described with reference to FIGS. 2A to 2C. FIG. 2A is a schematic diagram of the inside of the compacted product after the compacting step and before the heat treatment step for manufacturing the powder core according to one embodiment of the present invention, FIG. 2B illustrates the inside after the heat treatment step for manufacturing the powder core according to one embodiment of the present invention, and FIG. 2C is a schematic diagram of the inside of the powder core after the outer coating step for manufacturing the powder core according to one embodiment of the present invention. As illustrated in FIG. 2A, in a compacted product 1A obtained through the compacting step, a soft magnetic powder MM is bonded and fixed by a binder component BM containing a resin-based material. When the compacted product 1A is subjected to a heat treatment step, as illustrated in FIG. 2B, the binder component BM decomposes and evaporates, thereby generating a pyrolysis residue TDM, and the soft magnetic powder MM in the compact 1B is bonded and fixed by the pyrolysis residue TDM. Thus, compared to the compacted product 1A, the compact 1B includes a larger volume of voids PR. Note that the heat treatment step illustrated in FIG. 2B is, for example, an annealing step for eliminating strain as described above.

In such a case also, in the powder core 1 of the present invention manufactured through steps including the outer coating step performed on the compact 1B, as illustrated in FIG. 2C, a material (outer coating material) CRM constituting the outer coating and containing polyethersulfone can be located so as to fill at least part of the voids PR. Thus, in the powder core 1, the volume of the voids PR decreases, and the soft magnetic powder MM is bonded and fixed by the pyrolysis residue TDM and the outer coating CRM, thereby enhancing the mechanical strength. Moreover, since polyethersulfone, which does not have to be thermally cured after coating, is used in the outer coating material CRM, the stress caused by thermal curing after the outer coating is not applied to the powder core 1. Thus, the magnetic properties of the powder core 1 obtained through the outer coating step are maintained or improved. Moreover, since the outer coating material CRM uses polyethersulfone, which undergoes little thermal denaturation, deterioration of the magnetic properties of the powder core 1 caused by thermal denaturation of the outer coating material CRM or oxidation of the soft magnetic powder MM is suppressed even when the powder core 1 is put in a high temperature environment.

(2) Outer Coating

The powder core 1 according to one embodiment of the present invention includes an outer coating. The outer coating is a layer that covers at least part of the compact 1B to improve mechanical strength etc., of the compact 1B. Since the compact 1B is formed by pressing a mixture containing the soft magnetic powder MM, the surface thereof sometimes has irregularities derived from the soft magnetic powder MM. In addition, when the mixture contains the binder component BM and the compact 1B contains the pyrolysis residue TDM of the binder component BM, the compact 1B may have voids PR, as described above. In such a case, the material constituting the outer coating may be present not only on the surface of the compact 1B but also in regions inside from the surface to some extent. In other words, the outer coating may have a penetrating structure with respect to the compact 1B.

The outer coating of the powder core 1 according to one embodiment of the present invention contains polyethersulfone. One non-limiting example of the method for manufacturing the outer coating is as follows. First, a liquid composition containing polyethersulfone and a solvent is prepared. Although the concentration of polyethersulfone in the liquid composition is not limited, considering the ease of preparation (ease of dissolving polyethersulfone), ease of handling (viscosity), and adjusting the thickness of the coating film formed on the compact 1B to be within an appropriate range, the concentration of polyethersulfone in the liquid composition is preferably 1 mass % or more and 40 mass % or less and more preferably 5 mass % or more and 20 mass % or less. The type of the solvent may be any as long as polyethersulfone can be dissolved. In some cases, a mixed solvent containing aprotic polar solvent, such as N-methylpyrrolidone, methyl ethyl ketone, or butyl acetate, and an aromatic solvent, such as xylene or toluene, is preferable. The liquid composition may contain a filler and a resin other than polyethersulfone as long as the object of the present invention can be achieved. In the description below, a specific example in which the liquid composition contains only polyethersulfone as a solid component is described.

Next, the prepared liquid composition and the compact 1B are put in contact with each other to form a coating film of the liquid composition in a region that includes the surface of the compact 1B. The contact method may be any. The simplest method is to immerse the compact 1B in the liquid composition for a particular time (for example, 5 to 30 minutes). Alternatively, the liquid composition may be sprayed toward the compact 1B. The atmosphere in which the liquid composition and the compact 1B are put into contact with each other may be at a reduced pressure. The coating amount of the liquid composition and the thickness of the coating film formed by the contact are any. As described above, since the compact 1B has voids PR, contact in a reduced pressure atmosphere or decreasing the viscosity of the liquid composition promotes penetration of the liquid composition into the inside of the compact 1B.

Next, the coating film formed on the compact 1B is dried to evaporate the solvent. The drying time and temperature are appropriately set according to the type of the solvent. Nonlimiting examples thereof include a temperature of about 60° C. to 170° C. and a time of about 20 minutes to 5 hours. In some cases, step-wise heating is preferable.

The outer coating of the powder core 1 according to one embodiment of the present invention contains polyethersulfone, and according to one preferable embodiment, the outer coating is composed of polyethersulfone; thus, when the powder core 1 is put in a 250° C. environment, changes in magnetic properties rarely occur. Specifically, the rate of increase in core loss when placed in the aforementioned environment for 200 hours can be 5% or less. In addition, the rate of decrease in relative permeability when placed in the aforementioned environment for 200 hours can be 5% or less (the rate of change can be −5% or more).

The outer coating of the powder core 1 according to one embodiment of the present invention contains polyethersulfone, and according to one preferable embodiment, the outer coating is composed of polyethersulfone; thus, even when the powder core 1 is put in a 250° C. environment, degradation of mechanical strength rarely occurs. Specifically, the initial radial crushing strength can be adjudged to 20 MPa or more, and even when the core is placed in the aforementioned environment for 200 hours, the radial crushing strength can be 20 MPa or more.

(3) Method for Manufacturing Powder Core

The method for manufacturing the powder core 1 according to one embodiment of the present invention is not particularly limited; however, the following manufacturing method can more efficiently manufacture the powder core 1 if this method is employed.

The method for manufacturing the powder core 1 according to one embodiment of the present invention includes a compacting step and an outer coating step described below and may further include a heat treatment step. More specifically, the present invention is manufactured by the following manufacturing method.

The method including: a compacting step of obtaining a compacted product by a compacting process that includes pressing a mixture containing the soft magnetic powder and the binder component; a heat treatment step of obtaining the compact by heating the compacted product obtained in the compacting step, the compact including the soft magnetic powder and a binding component composed of a pyrolysis residue of the binder component; and an outer coating forming step of forming an outer coating containing polyethersulfone by allowing a liquid composition containing polyethersulfone and a solvent to contact the compact so as to form a coating film of the liquid composition in a region that includes a surface of the compact, and drying the coating film to allow the solvent to evaporate. According to this method, a powder core that contains a binding component composed of a pyrolysis residue of a binder component can be efficiently manufactured.

(3-1) Compacting Step

First, a mixture containing a soft magnetic powder MM and a binder component BM is prepared. A compacted product can be obtained through a compacting process that includes pressing this mixture. The pressing conditions are not limited and are appropriately determined on the basis of the composition of the binder component BM etc. For example, when the binder component BM is composed of a thermosetting resin, pressing is preferably performed under heating so that the curing reaction of the resin proceeds in the die. In contract, for compression forming, the pressing force is high but heating is not a necessary condition, and the pressing time is short.

The case in which the mixture is a granulated powder and compression forming is performed is described in more details below. A granulated powder has excellent handling ease, and thus the operation property of the compression forming step, which involves a short compacting time and achieves excellent productivity, can be improved.

(3-1-1) Granulated Powder

The granulated powder contains a soft magnetic powder MM and a binder component BM. The binder component BM content in the granulated powder is not particularly limited. If the content is excessively low, it becomes difficult to retain the soft magnetic powder MM in the binder component BM. When the binder component BM content is excessively low, in the powder core 1 obtained through the heat treatment step, the binding component composed of the pyrolysis residue TDM of the binder component BM does not satisfactorily insulate particles of the soft magnetic powder MM from one another. Meanwhile, when the binder component BM content is excessively high, the binding component content in the powder core 1 obtained through the heat treatment step tends to be high. When the binding component content in the powder core 1 is high, the magnetic properties of the powder core 1 tend to be degraded due to the influence of the stress applied to the soft magnetic powder MM from the binding component. Thus, the binder component BM content in the granulated powder is preferably 0.5 mass % or more and 5.0 mass % or less with respect to the entirety of the granulated powder. From the viewpoint of stably decreasing the possibility of degradation of the magnetic properties of the powder core 1, the binder component BM content in the granulated powder is preferably 0.5 mass % or more and 3.5 mass % or less and is more preferably 0.6 mass % or more and 3.0 mass % or less with respect to the entirety of the granulated powder.

The granulated powder may contain a material other than the soft magnetic powder MM and the binder component BM described above. Examples of such a material include a lubricant, a silane coupling agent, and an insulating filler. When a lubricant is contained, the type of the lubricant is not particularly limited. The lubricant may be organic or inorganic. Examples of the organic lubricant include metal soaps such as zinc stearate and aluminum stearate. Such an organic lubricant evaporates during the heat treatment step and is considered to be substantially absent in the powder core 1.

The method for manufacturing the granulated powder is not particularly limited. A granulated powder may be obtained by directly kneading the components that constitute the granulated powder described above and then pulverizing the obtained kneaded product by a known method, or a granulated powder may be obtained by preparing a slurry by adding a solvent (a solvent medium or a dispersing medium, for example, water) to the above-described components, drying the slurry, and pulverizing the dried slurry. After pulverizing, screening or classification may be performed to control the particle size distribution of the granulated powder.

Figure 3:
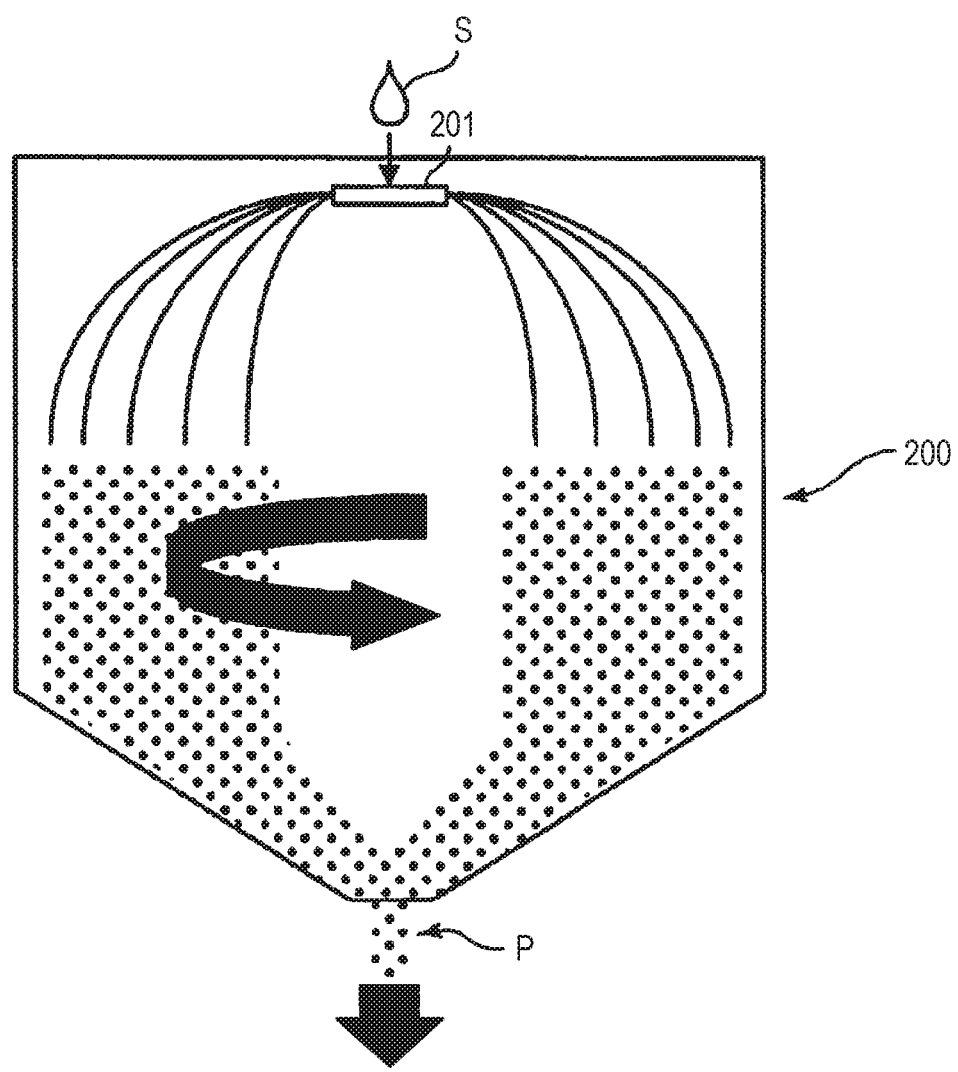
FIG. 3 is a schematic perspective view of a spray dryer device and operation thereof used in one example of a method for manufacturing a granulated powder.

One example of a method for obtaining a granulated powder from the slurry is a method that uses a spray dryer. As illustrated in FIG. 3, a rotor 201 is installed in a spray dryer device 200, and a slurry S is injected toward the rotor 201 from above the device. The rotor 201 rotates at a particular number of rotation and centrifugally sprays microdroplets of the slurry S in the chamber inside the spray dryer device 200. Furthermore, hot air is introduced to the chamber inside the spray dryer device 200 so as to evaporate the dispersion medium (water) contained in the microdroplets of the slurry S while maintaining the microdroplet shape. As a result, a granulated powder P is formed from the slurry S. The granulated powder P is recovered from the lower portion of the device 200.

The individual parameters, such as the number of rotations of the rotor 201, the temperature of the hot air introduced into the spray dryer device 200, and the temperature in the lower portion of the chamber, may be set as appropriate. Specific examples of the setting ranges of these parameters are: the number of rotation of the rotor 201: 4000 to 6000 rpm, the temperature of the hot air introduced into the spray dryer device 200: 130 to 170° C., and the temperature in the lower portion of the chamber: 80 to 90° C. The atmosphere and pressure inside the chamber may be set as appropriate. One example is to create an air atmosphere in the chamber, and set the pressure to 2 mm $H_2O$ (about 0.02 kPa) in terms of pressure difference with respect to atmospheric pressure. The particle size distribution of the obtained granulated powder P may be further controlled by screening or the like.

(3-1-2) Pressing Conditions

The pressing conditions in compression forming are not particularly limited. The conditions may be appropriately set by considering the composition of the granulated powder, the shape of the compact, etc. When the pressing force is excessively low during compression forming of the granulated powder, the mechanical strength of the compact is degraded. Thus, the issues such as degradation of the handling ease of the compact and degradation of mechanical strength of the powder core 1 obtained from the compact are likely to arise. Moreover, the magnetic properties of the powder core 1 may be degraded, and insulating properties may be degraded. Meanwhile, when the pressing force is excessively high during compression forming of the granulated powder, it becomes difficult to prepare a pressing die that can withstand such a pressure.

From the viewpoint of stably reducing the possibility that the compression forming step would adversely affect the mechanical properties and magnetic properties of the powder core 1 and from the viewpoint of facilitating industrial mass production, the pressing force for the compression forming of the granulated powder is preferably 0.3 GPa or more and 2 GPa or less in some cases, is more preferably 0.5 GPa or more and 2 GPa or less in some cases, and is particularly preferably 0.5 GPa or more and 1.8 GPa or less in some cases.

In compression forming, pressing may be performed under heating or at room temperature.

(3-2) Heat Treatment Step

The compacted product obtained through the compacting step may be the compact 1B of the powder core 1 according to this embodiment, or, as described below, the compacted product may be subjected to a heat treatment step to obtain the compact 1B. This heat treatment step is also referred to as an annealing step.

In the heat treatment step, the compacted product obtained in the compacting step described above is heated so that the distances between particles of the soft magnetic powder MM are corrected and the magnetic properties are thereby adjusted and so that the strain applied to the soft magnetic powder MM during the compacting step is moderated and the magnetic properties are thereby adjusted, and a compact 1B is obtained as a result.

As described above, the purpose of the heat treatment step is to adjust the magnetic properties of the compact 1B; thus, the heat treatment conditions such as the heat treatment temperature are set to yield the best magnetic properties of the compact 1B. One example of the method for setting the heat treatment conditions is to change the heating temperature of the compacted product while keeping other conditions, such as the temperature elevation rate and the time of holding the heating temperature, constant.

The evaluation standards for magnetic properties of the compact 1B when setting the heat treatment conditions are not particularly limited. A specific example of the evaluation items is the core loss of the compact 1B. In this case, the heating temperature of the compacted product may be set so that the core loss of the compact 1B is minimized. The core loss measurement conditions are set as appropriate, and an example is to set the frequency to 100 kHz and the maximum magnetic flux density to 100 mT.

The atmosphere for the heat treatment is not particularly limited. Since an oxidizing atmosphere increases the possibility of excessive progress of pyrolysis of the binder component BM and the possibility of progress of oxidation of the soft magnetic powder MM, the heat treatment is preferably performed in an inert atmosphere such as nitrogen or argon or a reducing atmosphere such as hydrogen.

(3-3) Outer Coating Step

An outer coating containing polyethersulfone is formed on the compact 1B formed of the compacted product obtained through the compacting step described above or the compact 1B obtained by performing the heat treatment step on the compacted product. An example of the manufacturing method is already described and thus the description therefor is omitted.

2. Electric or Electronic Component

An electric or electronic component according to one embodiment of the present invention includes the powder core according to one embodiment of the present invention described above. Specifically, the electric or electronic component according to one embodiment of the present invention includes a powder core, a coil, and connecting terminals respectively connected to end portions of the coil. Here, at least part of the powder core is positioned inside an induction magnetic field generated by the electric current when an electric current is supplied to the coil through the connecting terminals.

Figure 4:
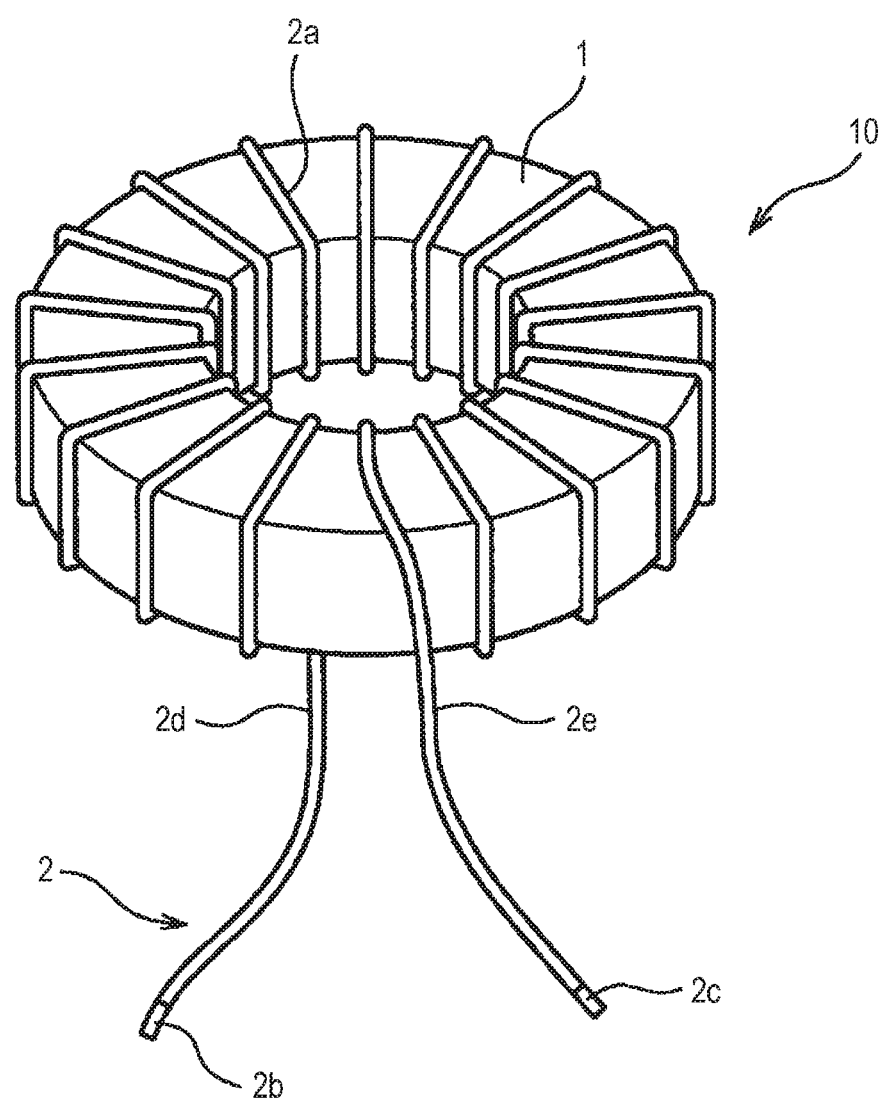
FIG. 4 is a schematic perspective view illustrating the shape of a toroidal core, which is an electronic component including the powder core according to one embodiment of the present invention.

One example of the electric or electronic component is a toroidal coil 10 illustrated in FIG. 4. The toroidal coil 10 includes a coil 2a formed by winding a coated conductive wire 2 around a ring-shaped powder core 1. End portions 2d and 2e of the coil 2a can be defined as portions of the conductive wire located between by the coil 2a formed of the wound coated conductive wire 2 and end portions 2b and 2c of the coated conductive wire 2. As described above, in the electric or electronic component according to this embodiment, the part that constitutes the coil and the parts that constitute connecting terminals may be formed of the same member. Note that the powder core is not limited to the ring-shaped powder core 1; for example, coil windings may be wound around a powder core of an EE-EI-, EER-PQ-, or I-type, or the coil may be enclosed inside the powder core.

Since the electric or electronic component according to one embodiment of the present invention includes the powder core according to one embodiment of the present invention, degradation of the properties of the electric or electronic component caused by changes in magnetic properties of the powder core rarely occurs even when the electric or electronic component is put in a high temperature environment (specifically, an environment of 250° C.) for a long time (specifically, 100 hours or longer). Moreover, since the powder core can maintain practical mechanical strength even when put in the aforementioned environment for a long time, problems of breaking of the electric or electronic component rarely occur during the manufacturing process of the electric or electronic component using the powder core, during mounting or assembly of the electric or electronic component as parts of electric or electronic devices, and even when thermal stress occurs due to mechanical load from outside, such as collision with another parts, and rapid temperature changes during the operation of the obtained electric or electronic device.

Examples of the electric or electronic component according to one embodiment of the present invention other than the toroidal coil 10 described above include reactors, transformers, and choke coils.

3. Electric or Electronic Device

An electric or electronic device according to one embodiment of the present invention includes the electric or electronic component that includes the powder core according to one embodiment of the present invention described above. Specific examples of the device include devices having the electric or electronic component mounted therein or devices having the electric or electronic component assembled therein. Specific examples of the electric or electronic device further include switching power supply devices equipped with voltage step-down and booster circuits, smoothing circuits, DC-DC converters, AC-DC converters, etc., and power control units used in solar power generation and the like.

Since these electric or electronic devices according to one embodiment of the present invention include the electric or electronic component equipped with the powder core according to one embodiment of the present invention described above, degradation of the magnetic properties of the powder core and the malfunctioning caused by breaking rarely occur even when the electric or electronic device is put in a high temperature environment (specifically, an environment of 250° C.) for a long time (specifically, 100 hours or longer). Thus, the electric or electronic device according to one embodiment of the present invention has excellent reliability.

The embodiments described above are described to facilitate understanding of the present invention and are not intended to limit the present invention. Thus, the individual elements disclosed in the embodiments are intended to include all design changes and equivalents within the technical scope of the present invention.

EXAMPLES

The present invention will now be described in further detail, but these examples and the like do not limit the scope of the present invention.

Example 1

(1) Preparation of Fe-Based Amorphous Alloy Powder

A powder of an amorphous magnetic material obtained by weighing raw materials so that the composition, $Fe_{74.3at\%}Cr_{1.56at\%}P_{8.78at\%}C_{2.62at\%}B_{7.57at\%}Si_{4.19at\%}$, was given was prepared as a soft magnetic powder MM by a water atomizing method. The particle size distribution of the obtained soft magnetic powder MM was measured as a volume distribution by using a Microtrac particle size distribution meter ("MT3300EX" produced by Nikkiso Co., Ltd.). As a result, the median diameter (D50), which is the particle diameter at a volume cumulative value of 50% in the particle size volume distribution, was 11 μm.

(2) Preparation of Granulated Powder

Next, 96.0 to 99.3 parts by mass of the soft magnetic powder MM, 0.5 to 2.0 parts by mass of an insulating binding material composed of an acrylic resin, 0.1 to 1.0 mass % of a silane coupling agent, and 0.1 to 1.0 parts by mass of a lubricant composed of zinc stearate were appropriately prepared and mixed, and a slurry was prepared therefrom using water as a solvent.

The obtained slurry was spray-dried in a spray dryer device ("D350AT-24HOP" produced by PRECI CO., LTD.) to obtain a granulated powder. The particle size distribution of the obtained granulated powder was measured as a volume distribution by using a laser diffraction/scattering particle size distribution meter ("LS13320" produced by Beckman Coulter, Inc.). As a result, the median diameter (D50), which is the particle diameter at a volume cumulative value of 50% in the particle size volume distribution of the measured granulated powder, was 85 μm.

(3) Compression Forming

The obtained granulated powder was packed in a die and was pressed at a surface pressure of 0.5 to 2 GPa so as to obtain a compacted product having a ring shape with 20 mm in outer diameter, 12.8 mm in inner diameter, and 6.8 mm in thickness.

(4) Heat Treatment

The obtained compact 1B was placed in a furnace in a nitrogen stream atmosphere and was subjected to a heat treatment that included elevating the in-furnace temperature from room temperature (23° C.) to 300 to 500° C., which was the optimum core heat treatment temperature, at a temperature elevation rate of 10° C./minute, holding this temperature for 1 hour, and then cooling the compact 1B in the furnace down to room temperature; as a result, a compact 1B was obtained.

(5) Outer Coating

Polyethersulfone ("5003PS" produced by Sumitomo Chemical Co., Ltd.) was dissolved in a N-methylpyrrolidone (NMP)/xylene mixed solvent (NMP:xylene=2:1 in terms of volume ratio) to prepare a liquid composition having a polyethersulfone concentration of 10 mass %.

The compact 1B was immersed in the obtained liquid composition for 15 minutes. Subsequently, the compact 1B was taken out of the liquid composition and dried at 80° C. for 30 minutes and then at 150° C. for 1 hour and at 250° C. for 1 hour to form a coating film of the liquid composition on the surface of the compact 1B; thus, a powder core having an outer coating on the compact 1B was obtained.

Example 2

A powder core was obtained as in Example 1 except that, in preparing the liquid composition, a different type of polyethersulfone ("4100P" produced by Sumitomo Chemical Co., Ltd.) was dissolved in a NMP/xylene mixed solvent (NMP:xylene=2:1 in terms of volume ratio) to prepare a liquid composition having a polyethersulfone concentration of 10 mass %.

Example 3

A compact 1B was obtained as in Example 1. A liquid composition was prepared by diluting a thermosetting polyimide ("UPIA-AT" produced by UBE INDUSTRIES, LTD.) with an NMP solvent so as to prepare a liquid composition having a thermosetting polyimide concentration of 10 mass %. The compact 1B was immersed in the obtained liquid composition for 15 minutes. Subsequently, the compact 1B was taken out of the liquid composition and dried at 80° C. for 30 minutes and then at 150° C. for 1 hour to form a coating film of the liquid composition on the surface of the compact 1B. The compact 1B having the coating film thereon was heated at 350° C. for 1 hour to obtain a powder core having an outer coating on the compact 1B.

Example 4

A compact 1B was obtained as in Example 1. An equivalent blend of polyamideimide ("V-8000BM" produced by DIC Corporation) and a bisphenol A-epoxy resin ("850-S" produced by DIC Corporation) was diluted with cyclohexanone as a solvent so as to prepare a liquid composition having a solid component concentration of 12 mass %. The compact 1B was immersed in the obtained liquid composition for 15 minutes. Subsequently, the compact 1B was taken out of the liquid composition and dried at 100° C. for 1 hour to form a coating film of the liquid composition on the surface of the compact 1B. The compact 1B having the coating film thereon was heated at 200° C. for 1 hour to obtain a powder core having an outer coating on the compact 1B.

Example 5

A powder core was obtained as in Example 4 except that, in preparing the liquid composition, methylphenylsilicone ("KR-271" produced by Shin-Etsu Chemical Co., Ltd.) was used instead of polyethersulfone and diluted with xylene as a solvent to prepare a liquid composition having a methylphenylsilicone concentration of 20 mass %.

Reference Example 1

A powder core formed of a compact 1B obtained as in Example 1 was obtained. In other words, the powder core of Reference Example 1 did not have an outer coating.

Test Example 1: Measurement of Relative Permeability and Rate of Change Therein Copper wires were wound around the powder cores prepared in Examples and Reference Examples to obtain toroidal cores. The relative permeability of the toroidal cores at a frequency of 100 kHz was measured with an impedance analyzer ("4192A" produced by HP). This relative permeability is referred to as the "initial relative permeability $\mu_0$".

The powder cores prepared in Examples and Comparative Examples were left standing in a 250° C. environment for 200 hours, and the relative permeability of the powder cores thereafter was measured by the aforementioned method. This relative permeability is referred to as the "post-heating relative permeability $\mu_1$".

The rate R$\mu$ (unit: %) of change in relative permeability was determined by the following formula:

$$R\mu = (\mu_1 - \mu_0)/\mu_0 \times 100$$

The initial relative permeability $\mu_0$, the post-heating relative permeability $\mu_1$, and the rate R$\mu$ of change in relative permeability are shown in Table 1. In Table 1, the resin types and concentrations (unit: mass %) of the liquid compositions used in examples are shown.

The rate RW (unit: %) of change in core loss was determined by the following formula:

$$RW = (W_1 - W_0)/W_0 \times 100$$

The initial core loss $W_0$, the post-heating core loss $W_1$, and the rate RW of change in core loss are shown in Table 1.

Test Example 3: Measurement of Radial Crushing Strength and Rate of Change Therein The initial radial crushing strength $S_0$ (unit: MPa) of the powder cores prepared in Examples and Reference Examples was determined by measurement through a test method in accordance with JIS Z 2507:2000.

The powder cores prepared in Examples and Comparative Examples were left standing in a 250° C. environment for 200 hours, and the post-heating radial crushing strength $S_1$ (unit: MPa) of the powder cores thereafter was measured by the test method in accordance with JIS Z 2507:2000.

The rate RS (unit: %) of change in radial crushing strength was determined by the following formula:

$$RS = (S_1 - S_0)/S_0 \times 100$$

The initial radial crushing strength $S_0$, the post-heating radial crushing strength $S_1$, and the rate RS of change in radial crushing strength are shown in Table 1.

As shown in Table 1, the powder cores of the examples of the present invention exhibited a rate of change in relative permeability of −5% or more (a rate of decrease of 5% or

TABLE 1

| | Liquid composition | | $\mu$@100 kHz | | | PCV (kW/m³) | | | Radial crushing strength (MPa) | | | |
| --- | --- | --- | --- | --- | --- | --- | --- | --- | --- | --- | --- | --- |
| | Resin type | Concentration (mass %) | Initial $\mu_0$ | Post-heating $\mu_1$ | R$\mu$ | Initial $W_0$ | Post-heating $W_1$ | RW | Initial $S_0$ | Post-heating $S_1$ | RS | Remarks |
| Example 1 | Polyethersulfone | 10% | 52.3 | 50.2 | −4.0% | 327 | 329 | 0.6% | 31.3 | 24.4 | −28% | Invention Example |
| Example 2 | Polyethersulfone | 10% | 52.4 | 50.2 | −4.0% | 334 | 330 | −1.0% | 27.0 | 22.9 | −18% | Invention Example |
| Example 3 | Thermosetting polyimide | 10% | 54.2 | 50.8 | −6.1% | 301 | 367 | 21.9% | 23.2 | 19.2 | −21% | Comparative Example |
| Example 4 | Polyamideimide + epoxy | 12% | 52.5 | 49.3 | −6.0% | 320 | 344 | 7.3% | 25.4 | 9.1 | −178% | Comparative Example |
| Example 5 | Methyl phenyl silicone | 20% | 52.7 | 48.6 | −7.8% | 277 | 416 | 50.2% | 12.0 | 23.6 | 49% | Comparative Example |
| Reference Example 1 | None (no outer coating) | | 52.9 | 50.5 | −4.5% | 306 | 308 | 0.8% | 3.1 | 6.7 | 54% | Reference Example |

Test Example 2: Measurement of Core Loss and Rate of Change Therein

Copper wires were wound around the powder cores prepared in Examples and Reference Examples to obtain toroidal cores. The core loss (PCV) of the toroidal cores at a frequency of 100 kHz and a maximum magnetic flux density of 100 mT was measured with a BH analyzer ("SY-8218" produced by IWATSU ELECTRIC CO., LTD.). This core loss is referred to as the "initial core loss $W_0$" (unit: kW/m³).

The powder cores prepared in Examples and Comparative Examples were left standing in a 250° C. environment for 200 hours, and the core loss of the powder cores thereafter was measured by the aforementioned method. This core loss is referred to as the "post-heating core loss $W_1$" (unit: kW/m³).

less) even after being put in a 250° C. environment for 200 hours, the rate of change in core loss was within ±1%, and the radial crushing strength was 20 MPa or more even after heating.

In contrast, the powder cores of Comparative Examples (Examples 3 to 5) exhibited a rate of decrease in relative permeability of 5% or less and a rate of increase in core loss of 5% or less, and at least one of the initial radial crushing strength and the post-heating radial crushing strength could not satisfy 20 MPa or more; thus, these powder cores did not have prominent properties for both the magnetic properties and the mechanical strength.

An electronic component that uses a powder core of the present invention is suitable for use as booster circuits of hybrid vehicles or the like, reactors, transformers, choke coils, etc., used in power stations and transformer stations.

What is claimed is:

1. A powder core comprising:
   a compact having an outer surface, the compact including a soft magnetic powder and a binding component; and
   an outer coating covering the outer surface of the compact as a layer disposed on the outer surface,
   wherein the outer coating is formed of a material containing polyethersulfone.

2. The powder core according to claim 1, wherein the soft magnetic powder contains at least one of a powder of an iron-based material and a powder of a nickel-based material.

3. The powder core according to claim 1, wherein the soft magnetic powder contains a powder of a crystalline magnetic material.

4. The powder core according to claim 1, wherein the soft magnetic powder contains a powder of an amorphous magnetic material.

5. The powder core according to claim 1, wherein the soft magnetic powder contains a powder of a nanocrystal magnetic material.

6. The powder core according to claim 1, wherein the soft magnetic powder is a mixture containing two or more selected from a crystalline magnetic material, an amorphous magnetic material, and a nanocrystal magnetic material.

7. The powder core according to claim 1, wherein the binding component is composed of a pyrolysis residue of a binder component containing a resin-based material.

8. An electric or electronic component comprising:
   the powder core according to claim 1;
   a coil; and
   connecting terminals respectively connected to end portions of the coil,
   wherein the powder core is placed such that, when an electric current is supplied to the coil through the connecting terminals, at least part of the powder core is positioned inside an induction magnetic field generated by the electric current.

9. An electric or electronic device comprising the electric or electronic component according to claim 8.

10. The powder core according to claim 1, wherein the binding component is a resin.

11. The powder core according to claim 1, wherein a portion of the material forming the outer coating is disposed between particles of the soft magnetic powder of the compact under the outer surface.

12. The powder core according to claim 7, wherein a portion of the material forming the outer coating is disposed between particles of the soft magnetic powder in the compact under the outer surface, such that the portion of the material forming the outer coating fills at least part of voids in the pyrolysis residue of the binder component of the compact.

13. The powder core according to claim 1, wherein a median diameter of particles of the soft magnetic powder is 1 μm to 45 μm.

14. The powder core according to claim 1, wherein the soft magnetic powder contains an amorphous portion.

15. The powder core according to claim 1, wherein the soft magnetic powder contains 74.3-100 at. % Fe.

16. The powder core according to claim 4, wherein the amorphous magnetic material is a Fe—P—C alloy, and optionally contains at least one element selected from the group consisting of Ni, Sn, Cr, B, and Si.

17. The powder core according to claim 4, wherein the amorphous magnetic material includes an amorphous alloy represented by $Fe_{100at\%-a-b-c-x-y-x-t}Ni_aSn_bCr_eP_xC_yB_zSi_t$, where 0 at %≤a≤10 at %, 0 at %≤b≤3 at %, 0 at %≤c≤6 at %, 6.8 at %≤x≤13.0 at %, 2.2 at %≤y≤13.0 at %, 0 at %≤z≤9.0 at %, 0 at %≤t≤7 at %.

18. A powder core comprising:
   a compact containing a soft magnetic powder, the compact having an outer surface; and
   an outer coating made of a material containing polyethersulfone, the outer coating disposed on the outer surface of the compact, the outer coating including a portion penetrating into the compact under the outer surface,
   wherein an amount of polyethersulfone present in the compact in a vicinity of the outer surface is greater than an amount of polyethersulfone present in an area away from the outer surface of the compact.

19. A powder core comprising:
   a plurality of soft magnetic particles;
   a binding component which is a pyrolysis residue of a resin-based material, the binding component directly connecting the soft magnetic particles such that the soft magnetic particles and the binding component form a compact of the powder core; and
   a resin material layer containing polyethersulfone formed on and covering an outer surface of the compact.

20. The powder core according to claim 1, wherein the outer coating entirely covers the outer surface of the compact.

* * * * *